US010809794B2

(12) United States Patent
Hsiao et al.

(10) Patent No.: US 10,809,794 B2
(45) Date of Patent: Oct. 20, 2020

(54) 3D NAVIGATION MODE (71) Applicant: HEWLETT-PACKARD DEVELOPMENT COMPANY, L.P., Houston, TX (US)

(72) Inventors: Chih Pin Hsiao, Palo Alto, CA (US); Gregory William Cook, Palo Alto, CA (US); Jishang Wei, Palo Alto, CA (US); Mithra Vankipuram, Palo Alto, CA (US); Nelson L Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 229 days.

(21) Appl. No.: 15/511,749

(22) PCT Filed: Dec. 19, 2014

(86) PCT No.: PCT/US2014/071591
§ 371 (c)(1),
(2) Date: Mar. 16, 2017

(87) PCT Pub. No.: WO2016/099559
PCT Pub. Date: Jun. 23, 2016

(65) Prior Publication Data
US 2017/0293350 A1    Oct. 12, 2017

(51) Int. Cl.
*G06F 3/01*    (2006.01)
*G06F 3/0481*    (2013.01)
(Continued)

(52) U.S. Cl.
CPC .............. *G06F 3/011* (2013.01); *G06F 3/017* (2013.01); *G06F 3/0346* (2013.01);
(Continued)

(58) Field of Classification Search
CPC ........ G06F 3/011; G06F 3/017; G06F 3/0346; G06F 3/04815; G06F 3/04883; G06T 19/00; G06T 19/003
See application file for complete search history.

(56) References Cited

U.S. PATENT DOCUMENTS 8,510,039 B1    8/2013  Troy et al.
2009/0079696 A1*  3/2009  Shin ..................... H04N 5/4403
                                                345/169

(Continued)

FOREIGN PATENT DOCUMENTS

JP         05595935 B2    9/2014
KR    10-2014-0105362 A    9/2014

OTHER PUBLICATIONS

Cohen, P et al; (1999). Multimodal interaction for 2D and 3D environments. IEEE Computer Graphics and Applications, 19(4), pp. 10-13.

(Continued)

*Primary Examiner* — Ariel A Balaoing
(74) *Attorney, Agent, or Firm* — HPI Patent Department (57) ABSTRACT

An example method is provided in according with one implementation of the present disclosure. The method includes identifying an intention of a user of a system in relation to a three-dimensional (3D) virtual object and selecting a 3D navigation mode from a plurality of 3D navigation modes based on the identified user intention. The plurality of 3D navigation modes includes at least a model navigation mode, a simple navigation mode, a driving navigation mode, a reaching navigation mode, and a multi-touch navigation mode. The method further includes transitioning the system to the selected 3D navigation mode.

16 Claims, 6 Drawing Sheets

(51) Int. Cl.
*G06T 19/00* (2011.01)
*G06F 3/0346* (2013.01)
*G06F 3/0488* (2013.01)

(52) U.S. Cl.
CPC ...... *G06F 3/04815* (2013.01); *G06F 3/04883* (2013.01); *G06T 19/00* (2013.01); *G06T 19/003* (2013.01); *G06F 2203/011* (2013.01); *G06F 2203/04808* (2013.01); *G06T 2200/24* (2013.01)

(56) References Cited

U.S. PATENT DOCUMENTS

| | | | | |
|---|---|---|---|---|
| 2009/0079700 A1* | 3/2009 | Abernathy | .......... | G06F 3/04845 345/173 |
| 2011/0087988 A1* | 4/2011 | Ray | ........ | G06Q 10/06 715/771 |
| 2013/0093680 A1* | 4/2013 | Ogita | .......... | G06F 1/1626 345/168 |
| 2013/0127825 A1 | 5/2013 | Joshi | | |
| 2013/0154913 A1* | 6/2013 | Genc | ........ | G06F 3/012 345/156 |
| 2013/0328762 A1* | 12/2013 | McCulloch | .......... | G02B 27/017 345/156 |
| 2014/0104206 A1 | 4/2014 | Anderson | | |
| 2014/0157206 A1* | 6/2014 | Ovsiannikov | ........ | G06F 3/0485 715/849 |
| 2014/0168261 A1* | 6/2014 | Margolis | ........ | G06F 3/011 345/633 |
| 2014/0184496 A1 | 7/2014 | Gribetz et al. | | |
| 2014/0201666 A1* | 7/2014 | Bedikian | ........ | G06F 3/017 715/771 |
| 2014/0232638 A1* | 8/2014 | Choi | ........ | G06F 3/013 345/156 |
| 2014/0320389 A1* | 10/2014 | Scavezzo | ........ | G06F 3/011 345/156 |
| 2014/0325455 A1 | 10/2014 | Tobin | | |
| 2014/0364212 A1* | 12/2014 | Osman | ........ | A63F 13/213 463/31 |
| 2016/0092080 A1* | 3/2016 | Swanson | ............ | G06F 3/04845 345/654 |
| 2016/0098095 A1* | 4/2016 | Gonzalez-Banos | ..... | G06F 3/017 345/156 |
| 2017/0153813 A1* | 6/2017 | Hao | ........ | G06F 3/04886 |
| 2017/0344177 A1* | 11/2017 | Wu | ........ | G06F 1/1626 |

OTHER PUBLICATIONS

Jansen, Y. et al, An interaction model for visualizations beyond the desktop. IEEE Trans on Visualization and Computer Graphics, 19(12), 2396-405.

Keefe, D. F., & Isenberg, T. (2013). Reimagining the Scientific Visualization Interaction Paradigm. Computer, 46(5), 51-57.

Maryam Khademi et al; "Multi-Perspective Multi-Layer Interaction on Mobile Device"; http://www.ics.uci.edu/~mingmin.

Shaer, O. et al; (2013). "From Big Data to Insights: Opportunities . . . ".Proc of the 7th Int'l Conf on Tangible. Embedded and Embodied Interaction, pp. 109-116.

* cited by examiner

3D NAVIGATION MODE

BACKGROUND

Interactive devices and systems continue to play an important role today. Some of these devices and systems may display three-dimensional ("3D") virtual objects (also called 3D visualizations). Organizations and individuals regularly use different types of interactive devices and systems in various areas and for different applications.

DETAILED DESCRIPTION OF SPECIFIC EXAMPLES

As noted above, with the recent improvements in technology, interactive devices and systems (i.e., devices and systems that may display visual objects and allow for user interaction) are becoming increasingly popular in all industries. Interactive devices and systems come in different sizes, forms, and may include different technical features. Different users rely on different type of interactive devices or systems for many day-to-day activities and work related tasks. As used herein, the term "user" refers to any type of individual, organization, group, business, or any other party that may need to operate or communicate with an interactive device or a system.

Due to the proliferation of various electronic devices, the technological capabilities of interactive systems are continuously changing and increasing. Some of these devices and systems may be capable of displaying 3D visualizations (also called virtual objects). As used herein, the terms "3D visualization" and "virtual object" are to be used interchangeably and refer to any type of 3D image or 3D formation that may be displayed and viewed. In some examples, these 3D visualizations may include different types of data represented in an interactive form. As a result, these interactive devices and systems may be widely used by organization, businesses, or individual users.

One problem with the available 3D interaction devices and systems is that they may not offer accurate and efficient ways for users to interact with or navigate 3D visualizations. In some situations, the existing systems and techniques for operating these systems and navigating 3D virtual objects are too complex and cumbersome. For example, the interactive systems may use conventional input sources (e.g., mouse, keyboard, etc.) that are difficult to operate when navigating 3D virtual objects. In addition, existing systems cannot automatically adapt to the user's behavior and may take a long time to switch between different navigation modes. Further, such systems may not offer an existing selection of navigation modes that may be automatically selected based on the identified intention of a user. As used herein, the term "navigation mode" refers to different methods for navigating or moving the viewpoint of 3D objects in an interaction system. For example, a navigation mode may define navigation commands that an interaction system should expect and execute in relation to navigating and moving the viewpoint of 3D objects displayed by the system.

Due to the encumbrances described above, the learning curve of operating such systems and navigating 3D objects may be significantly extended and that makes these systems less desirable for users. Therefore, improved 3D systems and techniques for navigating 3D visualizations are desired. These systems may adapt to user's behavior and intent and may provide more transparent and intuitive ways for navigating in 3D spaces and manipulating 3D objects in these virtual spaces. This will increase the effectiveness, efficiency and user satisfaction with such interactive systems.

The present description is directed to an improved solution that automatically adapts to the user's behavior and, therefore, allow for better and more efficient navigation of 3D visualizations. In one example, a processor of a system may: identify an intention of a user of a system in relation to a 3D virtual object, select a 3D navigation mode from a plurality of 3D navigation modes based on the identified user intention, and transition the system to the selected 3D navigation mode. In some examples, the plurality of 3D navigation modes may include at least a model navigation mode, a simple navigation mode, a driving navigation mode, a reaching navigation mode, and a multi-touch navigation mode.

Thus, the proposed system may evaluate the user's intentions (i.e., future behavior), to transition the system to an appropriate navigation mode selected from an existing plurality of navigation modes based on the intentions. Further, the proposed system may implement a navigation action with the 3D virtual object in the selected 3D navigation mode based on a detected user gesture and the identified user intention. Thus, instead of needing to use buttons to switch between different navigation modes, the system may adapt to the user's behavior and may switch its navigation mode according to the current use context. The proposed system and available plurality of navigation modes enables intuitive ways to navigate 3D visualizations.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description ad should not be regarded as limiting. The use of "including," "comprising" or "having" and variations thereof herein is meant to encompass the items listed thereafter and equivalents thereof as well as additional items.

Furthermore, the term "based on," as used herein, means "based at least in part on." It should also be noted that a plurality of hardware and software based devices, as well as a plurality of different structural components may be used to implement the disclosed methods and devices.

Figure 1:
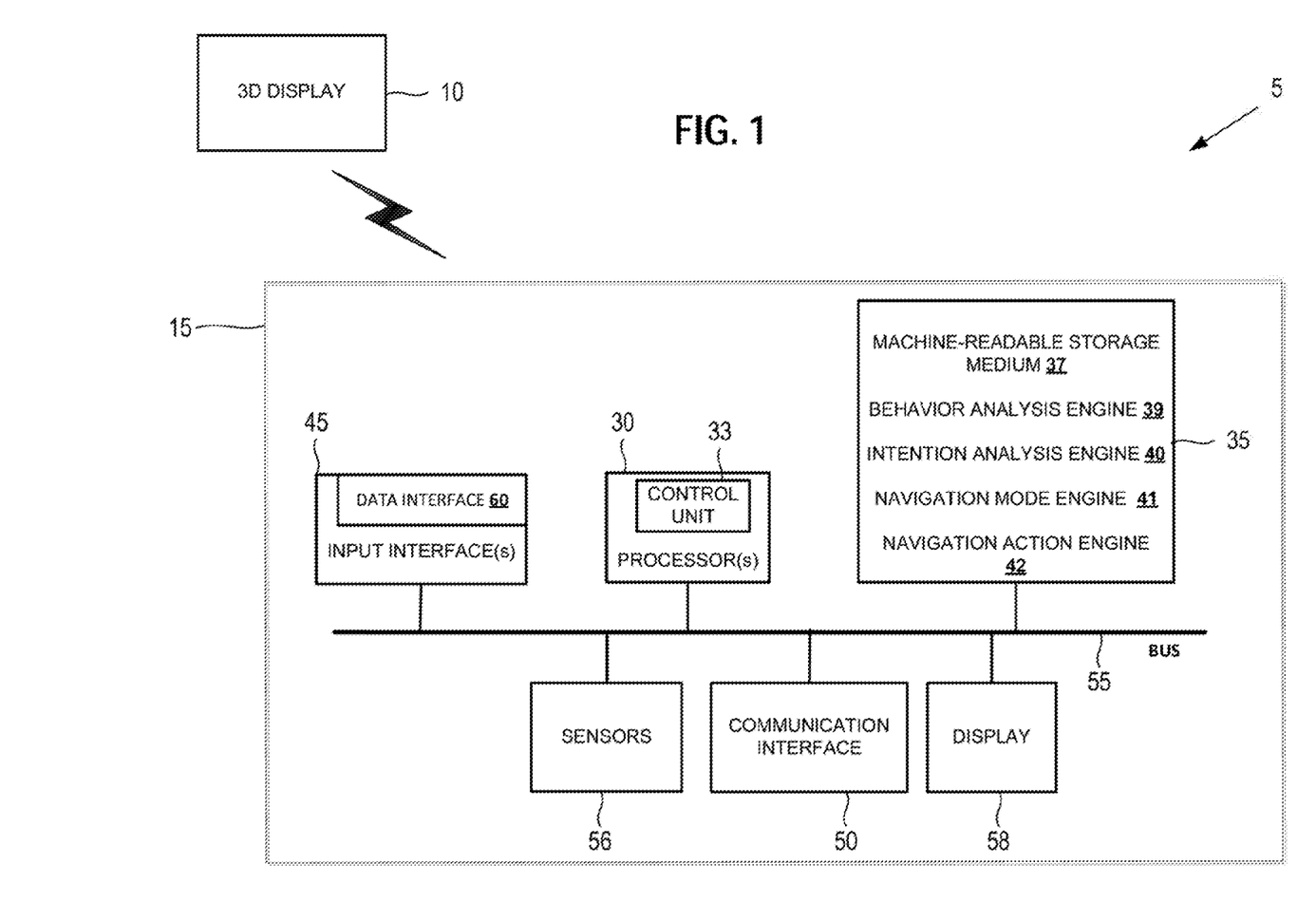
FIG. 1 is a schematic illustration of an example interactive system in accordance with an implementation of the present disclosure.

Referring now to the figures, FIG. 1 is a schematic illustration of an example interactive system 5. The illustrated system 5 is capable of carrying out the techniques described below. As shown in FIG. 1, the system 5 is depicted as including a 3D display 10 (e.g., a stereoscopic display) and an auxiliary computing device 15.

The 3D display 10 may display at least one 3D visualization (not shown) that can include any type of 3D object (e.g., data, text, media, etc.). In one example, the 3D object may be shown on physical surface or screen (not shown) of the 3D display 10. In another example, the 3D object may appear floating in 3D space defined around (e.g., in front, in back, on top, on side, etc.) the 3D display 10 (not shown).

In one implementation, the computing device 15 may be a portable computing device (e.g., a tablet, a laptop, a smartphone, a personal digital assistant (PDA), etc.). In some examples, the system 5 may involve multiple users where each user "brings" a separate computing device for simultaneous or separate interaction with the 3D display 10.

The computing device 15 may include at least one processor 30, a memory 35, a plurality of engines 39-42, an input interface(s) 45, a communication interface 50, a plurality of sensors 56, and a multi-touch display panel 58. In another implementation, the computing device 15 may be a personal computer, an all in one computing device, a gaming console, a server, a visual player, an electronic notepad, a plurality of distributed computing devices, or any other suitable computing device that includes a processor, a plurality of sensors and a multi-touch display. In the implementation where the computing device 15 is not a portable device, a plurality of sensors (e.g., inertial sensors) may be attached to the hands of the user of the system 5.

In other examples, the computing device 15 may include additional components and some of the components depicted therein may be removed and/or modified without departing from a scope of the system that allows for carrying out the functionality described herein. It is to be understood that the operations described as being performed by the processor 30 of the computing device 15 that are related to this description may, in some implementations, be performed by a processor in the 3D display 10, an external processor (not shown), or distributed between the computing device 15 and other electronic/computing devices (not shown).

As explained in additional details below, the computing device 15 may include software, hardware, or a suitable combination thereof configured to enable functionality of the computing device 15 and to allow it to carry out the techniques described below and to interact with the one or more systems or devices. The computing device 15 may include communication interfaces (e.g., a Wi-Fi® interface, a Bluetooth® interface, a 3G interface, a 4G interface, a near field communication (NFC) interface, etc.) that are used to connect with other devices/systems and/or to a network (not shown). The network may include any suitable type or configuration of network to allow for communication between the computing device 15, the 3D display 10, and any other devices/systems (e.g., other computing devices, displays, etc.).

The processor 30 of the computing device 15 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory 35, the engines 39-42, the input interfaces 45, the communication interface 50, the plurality of sensors 56, and the multi-touch display panel 58 may be operatively coupled to a bus 55. The processor 30 may be suitable to retrieve and execute instructions stored in machine-readable storage medium 37. Processor 30 can include single or multiple cores on a chip, multiple cores across multiple chips, multiple cores across multiple devices, or combinations thereof. The processor 30 may include at least one controller 33 and may be implemented using any suitable type of processing system where at least one processor executes computer-readable instructions stored in the memory 35.

The communication interface 50 may allow, the computing device 15 to communicate with plurality of networks, communication links, and external devices. The input interfaces 45 may receive information from devices/systems in communication with the computing device 15. In one example, the input interfaces 45 include at least a data interface 60 that may receive data from any external device or system.

The memory 35 may include any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored. The memory 35 may also be used for storing temporary variables or other intermediate information during execution of instructions to by the processor 30.

The computing device 15 may include various engines 39-42. Each of the engines 39-42 may include, for example, at least one hardware device including electronic circuitry for implementing the functionality described below, such as control logic and/or memory. In addition or as an alternative, the engines 39-42 may be implemented as any combination of hardware and software to implement the functionalities of the engines. For example, the hardware may be a processor and the software may be a series of instructions or microcode encoded on a machine-readable storage medium and executable by the processor. Therefore, as used herein, an engine may include program code, e.g., computer executable instructions, hardware, firmware, and/or logic, or combination thereof to perform particular actions, tasks, and functions described in more detail herein in reference to FIGS. 2-6.

The behavior analysis engine 39 may perform a behavior analysis of a user by using data from the plurality of sensors 56. For instance, the behavior analysis engine 39 may receive data from the sensors 56 and process the data to evaluate the behavior of the user. In one example, the behavior analysis engine 39 may determine an attention engagement level of the user (i.e., how engaged is the user with the elements of the system 5) and a pose of the user in relation to the auxiliary computing device 15 (i.e., how the user's hands hold the device 15). As explained in additional details below, the results from the behavior analysis engine 39 may be used to determine the navigation mode of the system 5 (i.e., what navigation command should the system be expecting and what navigation actions should be executing).

In one example, the intention analysis engine 40 may determine an intention of the user in relation to at least one 3D visualization based on the user's attention engagement level and the user's pose. For instance, according to the user's behavior detected by the behavior analysis engine 39, the system may determine what are the intentions of the user in relation to a 3D object (e.g., user is about to explore an object, select an object, measure distance, etc.). The navigation mode engine 41 may select 3D navigation mode from a plurality of 3D navigation modes based on the identified user intention. In one example, the plurality of navigation modes includes at least a model navigation mode, a simple navigation mode, a driving navigation mode, a reaching navigation mode, and a multi-touch navigation mode. Thus, the system 5 may adapt its navigation mode to the predicted behavior of the user.

The navigation action engine 42 may implement a navigation action (e.g., move, rotate the 3D object, adjust the view of the 3D object, etc.) with the at least one 3D visualization based on at least one of tee selected navigation mode and a detected user gesture. In one example, the system may recognize user inputs provided through gestures and may perform a specific navigation action based on the gesture and the previously selected navigation mode. In another example, the system may perform a specific navigation action based only on the selected navigation mode.

The plurality of sensors 56 may include different types of sensors that define a gestural interaction space (not shown) around the computing device 15. In one example, the sensors may include at least one optical depth sensor (e.g., stereo correlator, structured light, time-of-flight, etc.) positioned on the computing device 15 for scanning or collecting information from an environment around the device 15. The optical depth sensors may assist with recognizing the position of the computing device and identifying of various hand gestures of a user. In some implementations (e.g., when the device 15 is too thin and can't accommodate sensors), the system 5 may include a removable jacket (not shown) attachable to the computing device 15 to include the optical depth sensors. The removable jacket may have any form or size that fits the computing device 15.

In addition, the system 5 may include at least one passive optical sensor (e.g., a camera, etc.) positioned on the computing device 15 for scanning or collecting information from an environment wound the device 15. The passive optical sensor may provide visual feedback of a user (e.g., eyes, head detection, etc.). The system 5 may also include a plurality of inertial sensors (e.g., accelerometers, gyroscopic sensors, magnetometers, etc.) positioned on the computing device 15 that may recognize movement and position of the computing device and hand position of the user (e.g., by the orientation/angle of the device 15).

The display panel 58 may be an LCD (Liquid Crystal Display), OLED (organic light emitting display) or another type of display. In one example, the display 58 may be a multi-touch display that can be controlled by the user through simple or multi-touch gestures. The display 58 may include any suitable touch-sensitive display technology that may be used for detecting touches on the touch-sensitive display. In some implementations, the display 58 may include at least one of a prismatic film (e.g., for glasses free operation) and a polarizing film (for use with passive optical glasses) attached to a top surface of the computing device 15 and covering the multi-touch display. In some examples, the film may be added to a jacket for the computing device 15. Having a prismatic film or a polarizing film on the display 58 may allow a user to view 3D visualizations on the computing device 15 and to move these 3D visualizations to the 3D display 10.

Figure 2:
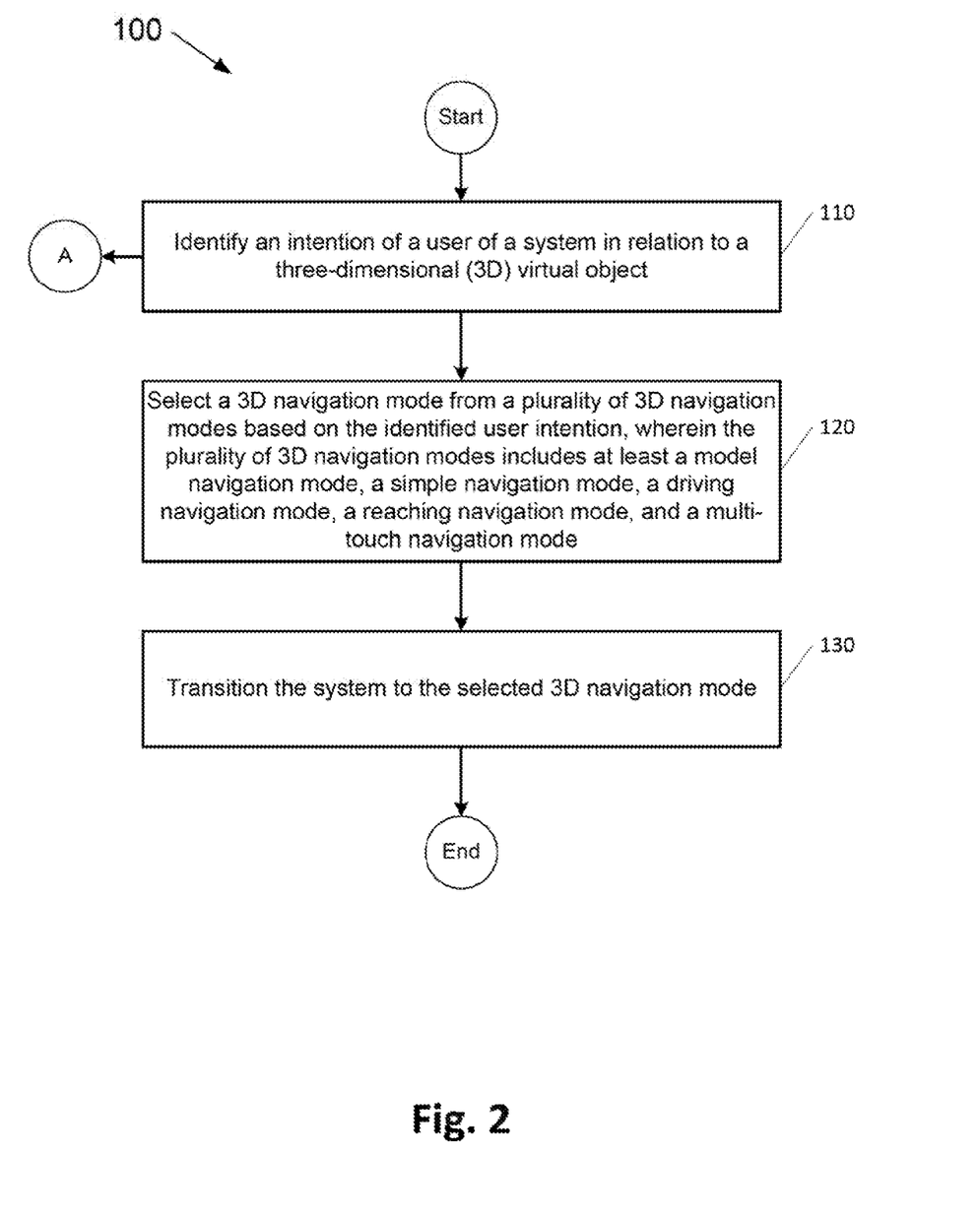
FIG. 2 illustrates a flow chart showing an example of a method for transitioning an interactive system to a selected 3D navigation mode in accordance with an implementation of the present disclosure.

FIG. 2 illustrates a flow chart showing an example of a method 100 for transitioning an interaction system to selected 3D navigation mode. Although execution of the method 100 is described below with reference to the system 5, the components for executing the method 100 may be spread among multiple devices. The method 100 may be implemented in the form of executable instructions stored on a machine-readable storage medium, such as storage medium 37, and/or in the form of electronic circuitry.

In one example, the method 100 can be executed by the processor 30 of the computing device 15. In other examples, the method may be executed by a processor on the 3D display 10, or another processor in communication with the system 5. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 begins at 110, where the processor 30 may identify an intention of a user of a system in relation to a 3D virtual object. In one example, the processor 30 may analyze various data received from the plurality of sensors 56 and the elements of the system 5 to examine the behavior of a user and to determine the user's intention in relation to a 3D virtual object. The processor may use various techniques to identify the intention of the user based on the acquired data. One example of such technique is described below in relation to FIG. 3.

At 120, the processor 30 may select a 3D navigation mode from a plurality of 3D navigation modes based on the identified user intention. The selection may be automatic (e.g., based on the identified intention of the user) or may be manual (e.g., perfumed by the user). In One example, the plurality of 3D navigation modes includes at least a model navigation mode, a driving navigation mode: a simple navigation mode, a reaching navigation mode, and a multi-touch navigation mode. The characteristics of the 3D navigation modes are described in more details below.

Next, the processor 30 may transition the system to the selected 3D navigation mode (at 130). In one example, the processor may automatically adjust the system 5 to a specific navigation mode. That way, the system 5 may quickly adapt to the predicted behavior and intention of the user, which makes the system self-intuitive and much more appealing to users.

Figure 3:
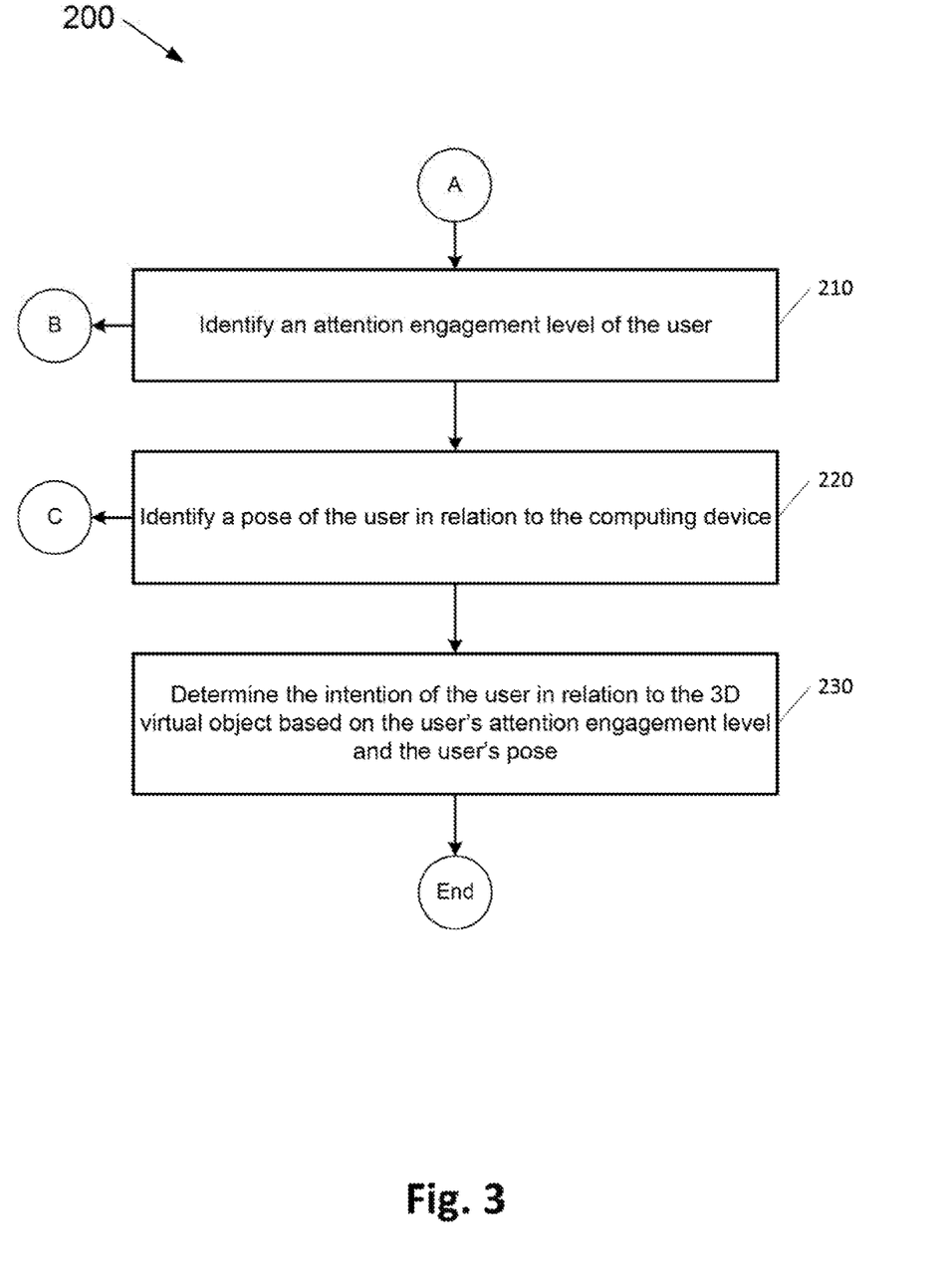
FIG. 3 illustrates a flow chart showing an example of a method for identifying an intention of a user in accordance with an example implementation of the present disclosure.

FIG. 3 illustrates a flow chart showing an example of a method 200 for identifying an intention of a user. In one example, the method 200 can be executed by the processor 30 of the computing device 15. Alternatively, the components for executing the method 200 may be spread among multiple devices.

The method 200 begins at 210, where the processor 30 may identify an attention engagement level of a user. In one example, the attention engagement level may be a real number that indicates the engagement of the user in relation to the elements of the system 5.

Figure 4:
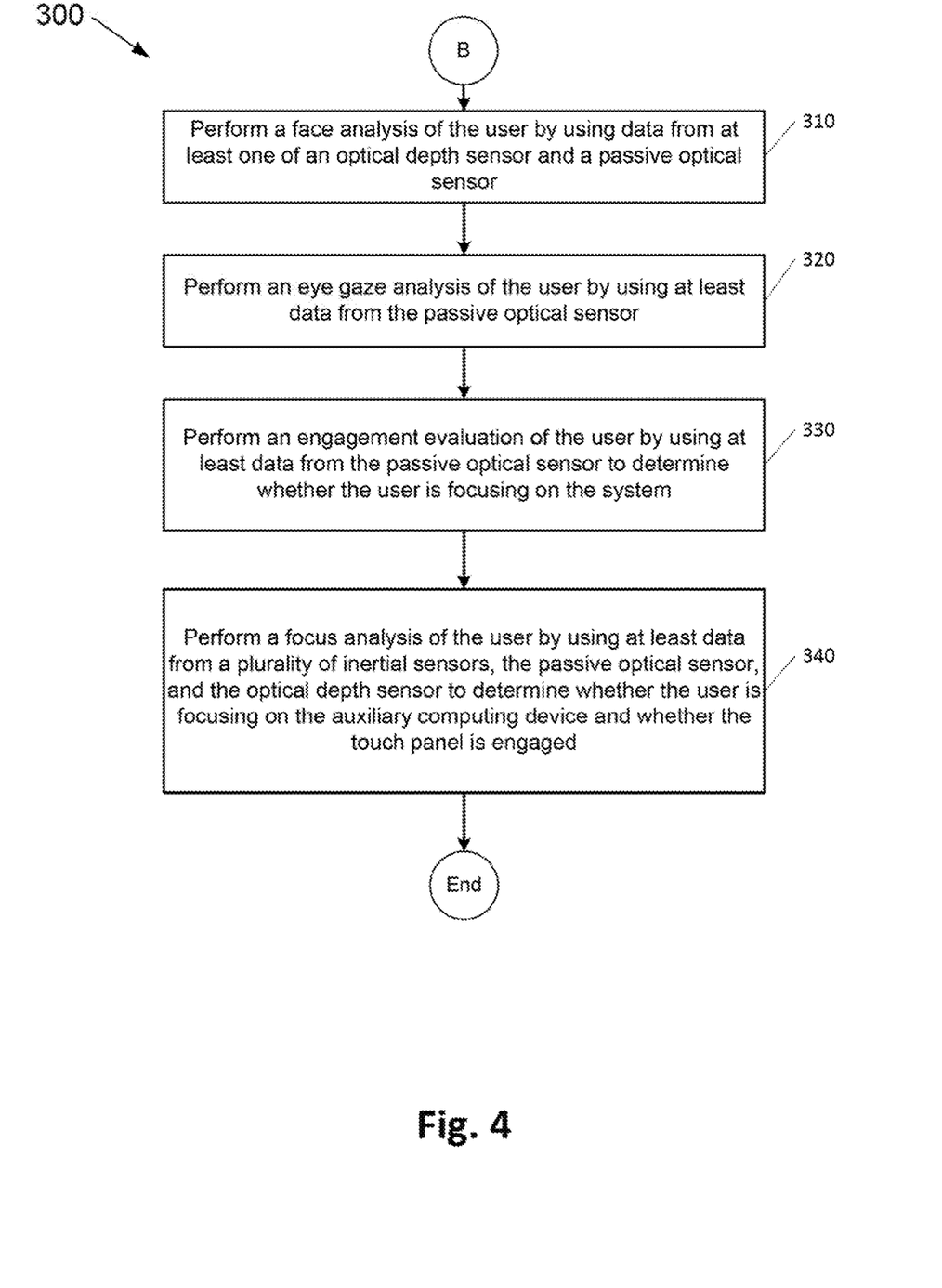
FIG. 4 illustrates a flow chart showing an example of a method for determining an attention engagement level of a user in accordance with an example implementation of the present disclosure.

FIG. 4 illustrates a flow chart showing an example of a method 300 for determining an attention engagement level of a user. In one example, the method 300 can be executed by the processor 30 of the computing device 15. Alternatively, the components for executing the method 300 may be spread among multiple devices.

The method 300 begins at 310, where the processor 30 may perform a face analysis of the user by using data from at least one of an optical depth sensor and a passive optical sensor. For example, based on the received data the processor may identify the position, orientation, etc. of the user's face. At 320, the processor may perform an eye gaze analysis of the user by using at least data from the passive optical sensor. For example, based on the received data the processor may identify the position, orientation, etc. of the user's eyes. Thus, the system 5 may use the data from an optical depth sensor and/or a passive optical sensor to analyze the users' face and eye gaze so that the system 5 knows how the user is looking at the elements of the system.

Next, the processor 30 may perform an engagement evaluation of the user by using at least data from the passive optical sensor to determine whether the user is focusing on the system 5 (at 330). The data from this and other sensors may be analyzed to confirm that the user is engaged with the elements of the system 5 (i.e., the 3D display, the computing device, the 3D objects, etc.). At 340, the processor 30 performs a focus analysis of the user by, using at least data from a plurality of inertial sensors, the passive optical sensor, and the optical depth sensor to determine whether the user is focusing on the auxiliary computing device and whether the touch panel/display is engaged (e.g., by analyzing an input from the display). For example, the system 5 analyzes the data from these sensors to determine whether the user is looking at the computing device 15 and whether the device 15 is not being widely waived about (i.e., which may indicate that a user may not be focused an the device).

With continued reference to FIG. 3, the processor 30 may identify a pose of the user in relation to the computing device (at 220). In one example, the pose of the user may indicate how the user's hands hold the computing device 15 of the system 5.

Figure 5:
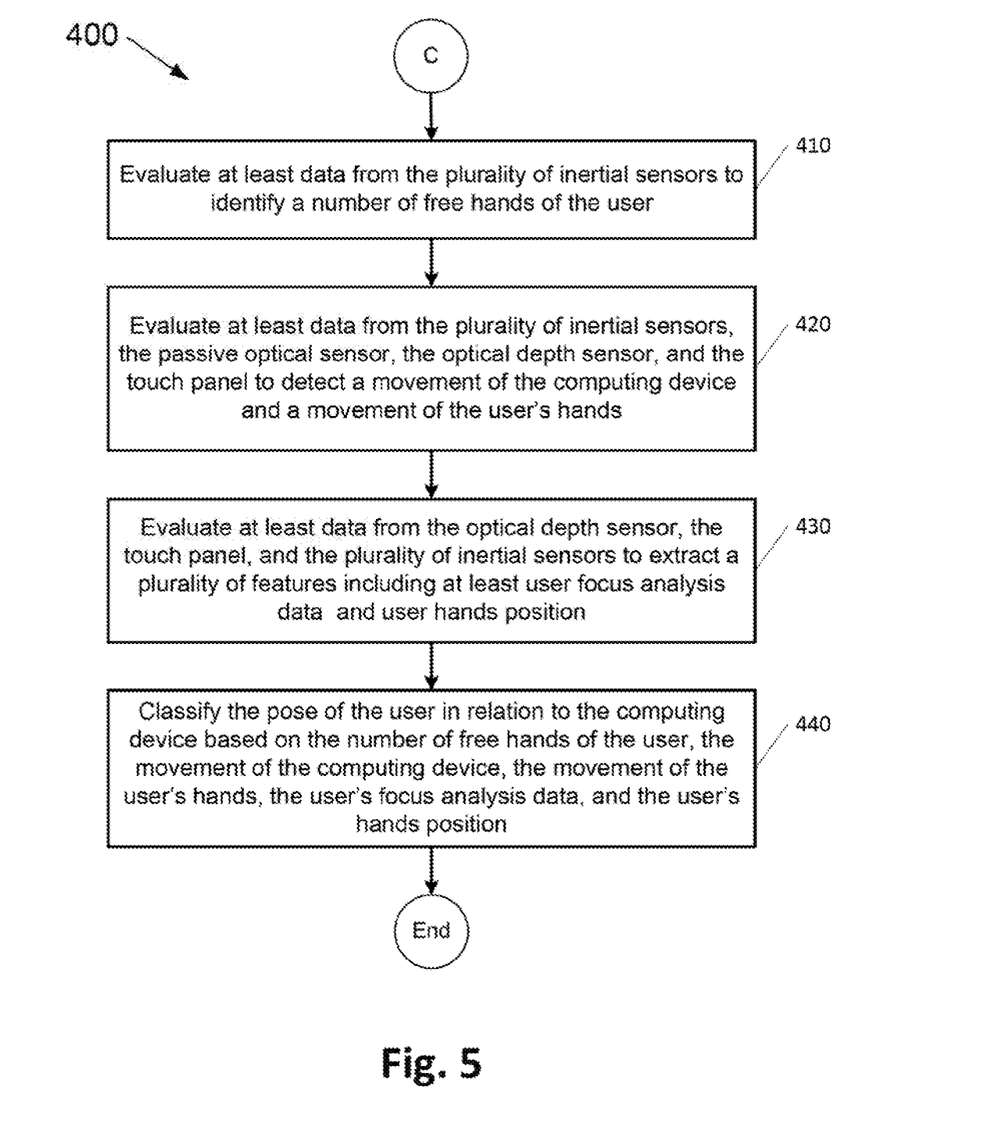
FIG. 5 illustrates a flow chart showing an example of a method for determining a pose of a user in relation to a computing device in accordance with an example implementation of the present disclosure.

FIG. 5 illustrates a flow chart, showing an example of a method 400 for determining a pose of the user in relation to the computing device 15. In one example, the method 400 can be executed by the processor 30 of the computing device 15. Alternatively, the components for executing the method 400 may be spread among multiple devices.

The method 400 begins at 410, where the processor may evaluate at least data from the plurality of inertial sensors to identify a number of free hands of the user. For example, the processor may analyze the received data in relation to a stability threshold to identify the number of user hands that are occupied by the auxiliary computing device 15 (e.g., one or two hands). At 420, the processor 30 may evaluate at least data from the plurality of inertial sensors, the passive optical sensor, the optical depth sensor, and the touch panel to detect a movement of the computing device and a movement of the user's hands. For example, the processor may analyze the received data in relation to a proximity threshold to determine what is the current movement of the device 15 (e.g., is the device being held, is the device positioned on a surface, etc.) and the hands of the user (e.g., one hand is holding the device 15, the other hand is pointing towards a 3D object, both hands are holding the device 15, etc.).

At 430, the processor 30 may evaluate at least data from the optical depth sensor, the touch panel, and the plurality of inertial sensors to extract a plurality of features including at least user focus analysis data and user hands position. In one example, the user focus analysis data may be the data identified at block 340 of the method 400 (i.e., whether the user is focusing on the computing device 15 and whether the touch panel is engaged). Further, the user hand position may identify a specific hand position by the user (e.g., fist, pointing, "ok" sign, flat hand, etc.) based on the data from the optical depth sensor and the touch panel 58.

Next, at 440, the processor may classifying the pose of the user in relation to the computing device based on the number of free hands of the user (or the number of free hands), the movement of the computing device, the movement of the user's hands, the user's focus analysis data, and the user's hands position. For example, the processor uses the available data to identify how the user is holding the device 15 (e.g., holds by two hands, holds by one on the edge, holds by one hand on the bottom, does not hold the device and both hands are free, etc.).

With continued reference to FIG. 3, the processor may determine an intention of the user in relation to the 3D virtual object based on the user's attention engagement level and the user's pose (at 230). In one example, based on the user's behavior (i.e., level of engagement with system 5 and the pose in relation to the device 15), the processor 30 may determine what are the intentions of the user in relation to the 3D objects (e.g., the user intends to select an object, view an object, etc.).

The system 5 may implement various navigation modes related to the 3D objects displayed by the system. The described list of navigation modes only represents an example of different modes and is not to be viewed as a complete list of all navigation modes that can be implemented by the system.

After the processor 30 transitions the system 5 to a navigation mode based on the identified user intention, the processor may implement or execute a navigation action with the 3D virtual object based on at least one of the selected 3D navigation mode and an identified user gesture. In one example, the processor 30 may recognize user inputs provided through different gestures, and may perform a specific navigation action with a 3D object (e.g., adjusting the 3D object, rotating the 3D object, adjusting the view of the 3D object, etc.) based on the gesture and the previously selected interaction mode. In another example, the processor may perform a specific navigation action with a 3D object based on the previously selected interaction mode and an activity performed with the elements of the system 5 (e.g., movement of the device 15).

In one example, the selected navigation mode may be a model navigation mode. The processor 30 may select the model navigation mode when the processor determines that the user is focusing on the 3D display 10 (e.g., as indicated by the user's attention engagement level) and that the user holds the computing device 15 with two hands (e.g., as indicated by the pose of the user in relation of the device 15). When the system is in the model navigation mode, the processor may automatically rotate the 3D virtual object according to an angular rate of rotation on the computing device 15. As used herein, the term "rotate" refers to the movement of a 3D virtual object around a center (or point) of rotation. For example, a 3D object may rotate around a rotation axis. Rotation may include turning or orbiting the 3D object (e.g., an alias or an alibi transformation of the 3D object). In some implementations a user of the system 5 may select between an alias and an alibi transformation when the system is in the model navigation mode (e.g., by using a selection button on the device 15).

In one example, when in model navigation mode, the 3D object on the 3D display 10 may be rotating when the user is only turning the computing device 15. Moving the computing device 15 in a specific angular rate of rotation moves the 3D object exactly the same way. That way, this navigation mode allows the user to adjust the orientation angles of the 3D object and to get the best view of the 3D object. In some examples, a profile of the 3D object may be displayed on the computing device 15 as well as on the 3D display 10 during the rotation process. In alternative examples, the 3D object may be displayed only on the 3D display 10.

In another example, the selected navigation mode may be a simple navigation mode. The processor 30 may select the simple navigation mode when the processor determines that the user is focusing on the 3D display 10 (e.g., as indicated by the user's attention engagement level) and that the user holds the computing device 15 with one hand (e.g., as indicated by the pose of the user in relation of the device 15). When the system is in the simple navigation mode, after an initial rotational movement of device 15, the processor may automatically rotate the 3D virtual object according to an angular rotational velocity of the computing device 15 until the 3D virtual object comes to a natural position. As used herein, the term "natural position" of a 3D object refers to any previously selected position of the 3D object (e.g., position where the 3D object is equally parallel to the ground and to the user's face, etc.). The values associated with the natural position may be set to the user's preference and may be later changed by the user. A user may set and select between several natural positions.

In one example, after an initial rotational movement of the device 15 by a user (e.g., any type of angular rotation), the processor 30 may detect the angular rotational velocity of the device 15 (i.e., when the user moves it at 20 degrees) and may change the position of the 3D virtual object according to the detected velocity of the device 15. The 3D object may continue to rotate at the indicated angular rotational velocity of the device 15 until the 3D objects comes to a natural position. Thus, reaching the predefined natural position of the 3D object does not depend on the type of initial rotational movement by the user (e.g., 15 degrees, 25 degrees, etc.).

In another example, the selected navigation mode may be a driving navigation mode. The processor nay select the driving navigation mode when the processor determines that the user is focusing on the 3D display 10 (e.g., as indicated by the user's attention engagement level) and that the user holds the computing device 15 with one hand (e.g., as indicated by the pose of the user in relation of the device 15). When the system is in the driving navigation mode, the processor may rotate the 3D virtual object according to a function of the rotation angle of the computing device 15.

When in driving navigation mode, in one example, the processor 30 may detect the rotation angle of the device 15 (i.e., after the user rotates it at a specific angel) and may change the position of the 3D virtual object according to the detected rotation of the device 15. In one implementation, the angular rotation velocity of the 3D object may be proportional to the rotation angle of the device 15. The 3D object may continue to rotate at the indicated angular rotational velocity of the device 15 until the device 15 returns to an initial position (e.g., when a user moves the device to a zero degree position, etc.).

In some implementations, similar date (e.g., attention engagement level, the pose of the user in relation of the device 15, etc.) may be used by the processor to select the simple navigation mode and the driving navigation mode. In some examples, the processor may initially select the simple navigation mode based on the received data. In other examples, processor may initially select the driving navigation mode. Further, the system may include a button that allows a user to select/switch between the different navigation modes (e.g., simple navigation mode, driving navigation mode, model navigation mode and the driving navigation mode, etc.).

In yet another example, the selected navigation mode may be a reaching navigation mode. The processor 30 may select the reaching navigation mode when the processor determines that the user is focusing on the 3D display 10 (e.g., as indicated by the users attention engagement level), that the user holds the computing device 15 with one hand (e.g., as indicated by the pose of the user in relation of the device 15), and that the other hand of the user performs a reaching gesture (e.g., pointing gesture, natural hands posture, etc.). Thus, one example, the processor may automatically adjust at least one of the view point of the 3D object and the 3D virtual object (e.g., by rotating the 3D object, etc.), when a reaching gesture is detected and the system is in a reaching navigation mode.

As used herein, adjusting the view point of the 3D object means that the user's (i.e., observer's) location and orientation is being changed, but the (perceived) 3D object's location and orientation remains stationary. For instance, the view point of the 3D object in relation to a user of the system may be adjusted to a more convenient angle for the user. As used herein, adjusting the 3D virtual object means adjusting the location and the orientation of the 3D object while the (perceived) observer's location and orientation are stationary. For example, the processor may automatically move the perception of the 3D virtual object closer to the user, when a reaching gesture is detected and the system is in a reaching navigation mode.

The reaching gesture may be directed across the detecting area of an optical depth sensor (e.g., when the device 15 is held with one hand in a typical viewing position, the reaching gesture is towards the 3D display 10). In some examples, adjusting the view point or automatically adjusting the 3D virtual object may be executed based on an integration of a velocity vector of the user's hand or any relation between velocity and physical motion. In some implementations, the velocity of the user's hand may be proportional to how far the navigation action may occur. In other example implementations, the processor may automatically adjust the view point of the 3D virtual object or automatically move the 3D virtual further from the user when the detected user's hand gesture is moving/pointing away from the 3D object.

Therefore, when in reaching navigation mode, the processor may determine that a user intends to explore the contents of a 3D object and may adjust the viewpoint to a convenient viewing angle for the user. A convenient viewing angle may depend on the type of displayed 3D object, the user's position, the user's preference, and on other factors. For example, the processor 30 may use data from the sensors 56 to evaluate the position of the user, the position of the user's hand, the distance between the user/hand and the 3D object, and the potential further movement of the user's hand. That way, the processor may adjust the view point of the 3D virtual object or may move the 3D virtual object closer to the user until the user's hand comes out of that detected gesture or the system switches to a different navigation mode (based on the factors described above).

In another implementation, the selected navigation mode may be a multi-touch navigation mode. The processor 30 may select the multi-touch navigation mode when the processor determines that the user is focusing on the 3D display 10 (e.g., as indicated by the user's attention engagement level), that the user holds the computing device 15 with at least one hand (e.g., as indicated by the pose of the user in relation of the device 15), and that the other hand of the user performs a moving gesture on the touch panel 58. Thus, in one example, the processor may move the 3D object in a direction corresponding to the direction of a moving touch gesture, when a moving touch gesture is detected on the touch panel and the system is in the multi-touch navigation mode.

For example, the user may hold the device 15 with one hand, at least one finger of the user's hand (either a finger of the user's free hand or a finger from the hand holding the device) may be on the display 58, and that finger (e.g., thumb, index, etc.) may perform a moving gesture (e.g., sliding left, right, up, down, etc.). In that case, the processor may move the view point of the 3D object in the direction of the moving touch gesture. That way, a user may move or rotate the view point 3D object of the system.

Figure 6:
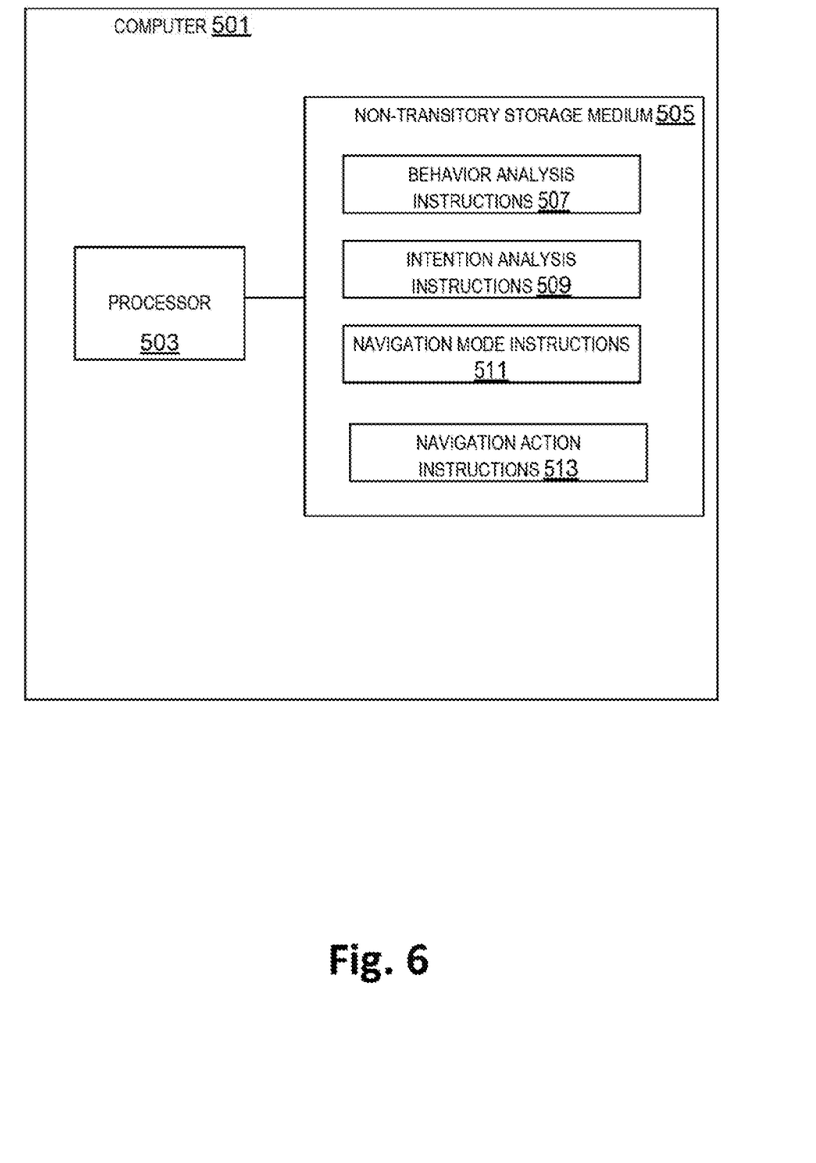
FIG. 6 is an example block diagram illustrating a computer-readable medium in accordance with an implementation of the present disclosure.

FIG. 6 illustrates a computer 501 and a non-transitory machine-readable medium 505 according to an example. In one example, the computer 501 maybe similar to the computing device 15 of the system 5 or may include a plurality of computers. For example, the computers may be server computers, workstation computers, desktop computers, laptops, mobile devices, or the like, and may be part of a distributed system. The computers may include one or more controllers and one or more machine-readable storage media. In one example, the computer may include a user interface (e.g., touch interface, mouse, keyboard, gesture input device, etc.).

Computer 501 may perform methods 100-400 and variations thereof. Additionally, the functionality implemented by computer 501 may be part of a larger software platform, system, application, or the like. Computer 501 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 501 may include a processor 503 and non-transitory machine-readable storage medium 505. The processor 503 may be similar to the processor 30 of the computing device 15 and non-transitory machine-readable storage media 505 may be similar to the machine-readable storage media 37 of the device 15. Software stored on the non-transitory machine-readable storage media 505 and executed by the processor 503 includes, for example, firmware, applications, program data, filters, rules, program modules, and other executable instructions. The processor 503 retrieves from the machine-readable storage media 505 and executes, among other things, instructions related to the control processes and methods described herein.

The processor 503 may fetch, decode, and execute instructions 507-513 among others, to implement various processing. As an alternative or in addition to retrieving and executing instructions, processor 503 may include at least one integrated circuit (IC), other control logic, other electronic circuits, or combinations thereof that include a number of electronic components for performing the functionality of instructions 507-513. Accordingly, processor 503 may be implemented across multiple processing units and instructions 507-513 may be implemented by different processing units in different areas of computer 501.

The instructions 507-513 when executed by processor 503 (e.g., via one processing element or multiple processing elements of the processor) can cause processor 503 to Perform processes, for example, methods 100-400, and/or variations and portions thereof. In other examples, the execution of these and other methods may be distributed between the processor 503 and other processors in communication with the processors 503.

For example, behavior analysis instructions 507 may cause processor 503 to perform behavior analysis of a user of a system displaying 3D object similar to the system 5. These instructions may function similarly to the techniques described in blocks 210 and 220 of method 200, and in more detail in the methods 300 and 400. For example, behavior analysis instructions 507 may cause processor 503 to identify an attention engagement level of the user, and to identify a pose of the user in relation to the computer 501.

Intention analysis instructions 509 may cause the processor 503 to perform an intention analysis of the user in relation to the 3D visualization based on the user's attention engagement level and the user's pose. These instructions may function similarly to the techniques described block 110 of method 100 and block 230 of the method 200. For example, based on the identified user's behavior (i.e., the level of engagement with system 5 and the pose in relation to a computing device), the intention analysis instructions 509 may cause the processor 503 to determine what are the intentions of the user in relation to the 3D object (e.g., the user intends to select an object, view an object, etc.).

Navigation mode instructions 511 may cause the processor 503 to transition the system to a 3D navigation mode selected from a plurality of 3D navigation modes based on the identified user intention. These instructions may function similarly to the techniques described blocks 120 and 130 of method 100. In one example, the processor may select a 3D navigation mode from the plurality of 3D navigation modes and may shift the system to the selected navigation mode.

Navigation action instructions 513 may cause the processor 503 to implement a navigation action with the 3D visualization based on at least one of the 3D navigation mode and a detected user gesture. In one example, the visualization action instructions 513 may cause the processor 503 to recognize user inputs provided through gestures and to perform a specific navigation action based on the gesture and the previously selected navigation mode. In another example, the system may perform a specific navigation action based only on the selected navigation mode.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by at least one processor:
   identifying an intention of a user of a system in relation to a three-dimensional (3D) virtual object based on an attention engagement level of the user on a computing device, physical engagement of the computing device by the user, and a determined number of hands of the user that hold the computing device;
   selecting a 3D navigation mode from a plurality of 3D navigation modes based on the identified user intention, wherein the 3D navigation mode is selected from the plurality of 3D navigation modes based on the determined number of hands of the user that hold the computing device, and wherein:
a model navigation mode is selected in response to determining that two hands hold the computing device,
a simple navigation mode or driving navigation mode is selected in response to determining that one hand holds the computing device,
a reaching navigation mode is selected in response to determining that one hand holds the computing device and another hand performs a reaching gesture, or
a multi-touch navigation mode is selected in response to determining that one hand holds the computing device and another hand performs a moving gesture on the computing device; and
transitioning the system to the selected 3D navigation mode.

2. The method of claim 1, wherein the system comprises a 3D display displaying at least one 3D virtual object, the computing device having a touch panel, and a plurality of sensors connected to the computing device, and wherein identifying the intention of a user in relation to the (3D) virtual object includes:
identifying the attention engagement level of the user,
identifying the physical engagement of the computing device by the user,
identifying a pose of the user in relation to the computing device, and
determining the intention of the user in relation to the 3D virtual object based on the user's attention engagement level, the user's physical engagement and the user's pose.

3. The method of claim 1, further comprising implementing a navigation action with the 3D virtual object based on at least one of the selected 3D navigation mode and an identified user gesture.

4. The method of claim 3, further comprising: automatically rotating the 3D virtual object according to an angular rate of rotation on the computing device, when the system is in the model navigation mode.

5. The method of claim 3, further comprising: detecting an initial rotational movement by the computing device and automatically rotating the 3D virtual object according to an angular rotational velocity of the computing device until the 3D virtual object comes to a natural position, when the system is in a simple navigation mode.

6. The method of claim 3, further comprising: rotating the 3D virtual object according to a function of a rotation angle of the computing device, when the system is in the driving navigation mode.

7. The method of claim 3, further comprising: automatically adjusting at least one of a view point of the 3D virtual object and the 3D virtual objet, when a reaching gesture is detected and the system is in the reaching navigation mode.

8. The method of claim 3, further comprising: moving the 3D virtual object in a direction corresponding to the direction of a moving touch gesture, when a moving touch gesture is detected on the touch panel and the system is in the multi-touch navigation mode.

9. A system comprising: (this claim relates to the proposed system) a 3D display displaying at least one 3D visualization;
a computing device including a touch display and a plurality of sensors;

a behavior analysis engine to perform a behavior analysis of a user by using data from the plurality of sensors, the behavior analysis engine to:
determine an attention engagement level of the user on the computing device,
determine a physical engagement of the computing device by the user, and
determine a pose of the user in relation to the computing device;
an intention analysis engine to determine an intention of the user in relation to the at least one 3D visualization based on the user's attention engagement level, the user's physical engagement, the user's pose, and a determined number of hands of the user that hold the computing device; and
a navigation mode engine to select a 3D navigation mode from a plurality of 3D navigation modes based on the identified user intention, wherein the 3D navigation mode is selected from the plurality of 3D navigation modes based on the determined number of hands of the user that hold the computing device, and wherein:
a model navigation mode is selected in response to determining that two hands hold the computing device,
a simple navigation mode or driving navigation mode is selected in response to determining that one hand holds the computing device,
a reaching navigation mode is selected in response to determining that one hand holds the computing device and another hand performs a reaching gesture, or
a multi-touch navigation mode is selected in response to determining that one hand holds the computing device and another hand performs a moving gesture on the computing device.

10. The system of claim 9, further comprising a navigation action engine to: execute a navigation action with the 3D visualization based on at least one of the selected 3D navigation mode and an identified user gesture.

11. The system of claim 10, wherein the navigation mode engine is further to: automatically rotate the 3D visualization according to an angular rate of rotation on the computing device, when the system is in the model navigation mode.

12. The system of claim 10, wherein the navigation mode engine is further to: automatically rotate the 3D visualization according to an angular rotational velocity of the computing device until the 3D visualization comes to a natural position, when the system is in the simple navigation mode.

13. The system of claim 10, wherein the navigation mode engine is further to: rotate the 3D visualization according to a function of a rotation angle of the computing device, when the system is in the driving navigation mode.

14. The system of claim 10, wherein the navigation mode engine is further to: automatically adjust at least one of a view point of the 3D visualization and the 3D visualization, when a reaching gesture is detected and the system is in the reaching navigation mode.

15. The system of claim 10, wherein the navigation mode engine is further to: move the 3D visualization in a direction corresponding to the direction of a moving touch gesture, when a moving touch gesture is detected on the touch panel and the system is in the multi-touch navigation mode.

16. A non-transitory machine-readable storage medium encoded with instructions executable by at least one processor, the machine-readable storage medium comprising instructions to: (this claim is directed towards the software that implements the main method)

perform a behavior analysis of a user of a system including a 3D display displaying a 3D visualization, a computing device having a touch display, and a plurality of sensors connected to the computing device by using data from the plurality of sensors, the behavior analysis to:
  identify an attention engagement level of the user on the computing device,
  identify a physical engagement of the computing device by the user, and
  identify a pose of the user in relation to the computing device;
perform an intention analysis of the user in relation to the 3D visualization based on the user's attention engagement level, the user's physical engagement, the user's pose, and a determined number of hands of the user that hold the computing device;
transition the system to a 3D navigation mode selected from a plurality of 3D navigation modes based on the identified user intention, wherein the 3D navigation mode is selected from the plurality of 3D navigation modes based on the determined number of hands of the user that hold the computing device, wherein:
  a model navigation mode is selected in response to determining that two hands hold the computing device,
  a simple navigation mode or driving navigation mode is selected in response to determining that one hand holds the computing device,
  a reaching navigation mode is selected in response to determining that one hand holds the computing device and another hand performs a reaching gesture, or
  a multi-touch navigation mode is selected in response to determining that one hand holds the computing device and another hand performs a moving gesture on the computing device; and
implement a navigation action with the selected 3D visualization based on at least one of the selected 3D navigation mode and a detected user gesture.

* * * * *